Nov. 12, 1935.  E. KINSELLA  2,020,687
APPARATUS FOR USE IN THE MANUFACTURE OF FILMS AND FOILS
Filed Jan. 11, 1933
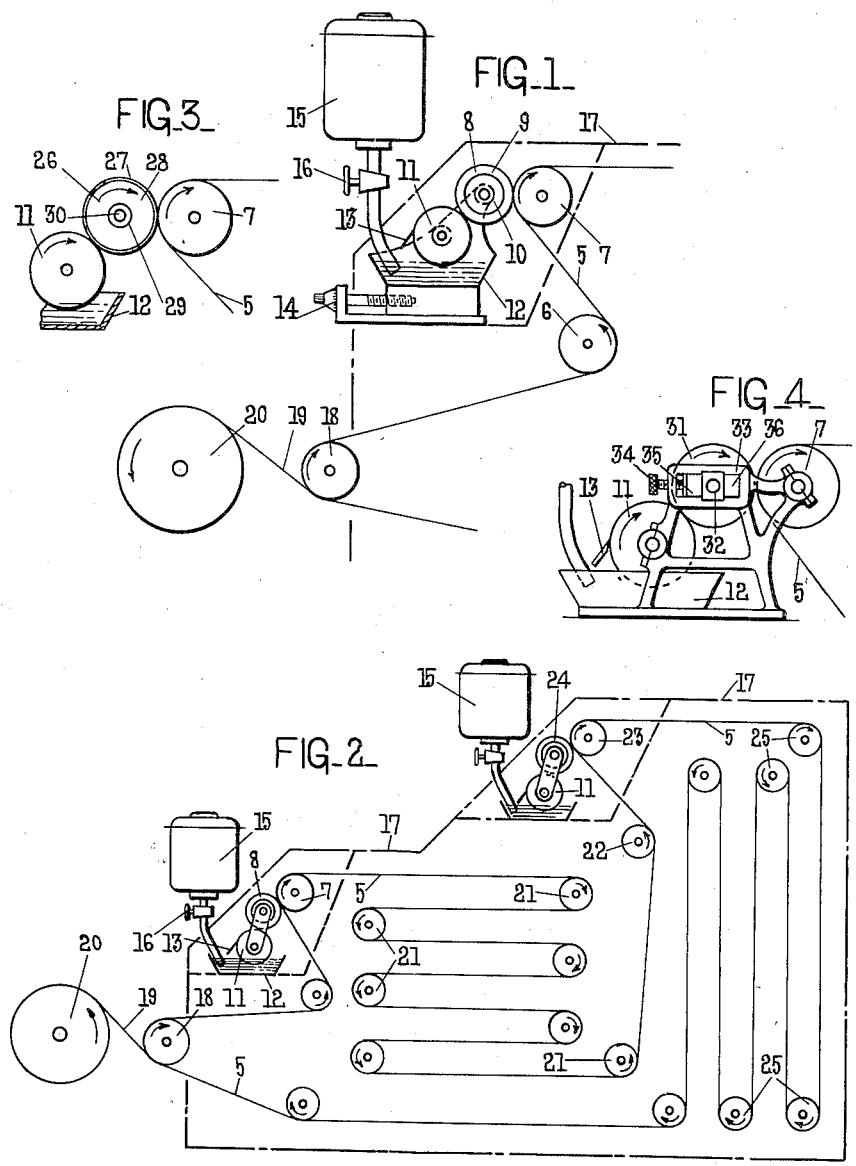
EDWARD KINSELLA
INVENTOR
ATTORNEYS Patented Nov. 12, 1935

2,020,687

UNITED STATES PATENT OFFICE 2,020,687

APPARATUS FOR USE IN THE MANUFACTURE OF FILMS AND FOILS

Edward Kinsella, Spondon, near Derby, England, assignor to Celanese Corporation of America, a corporation of Delaware Application January 11, 1933, Serial No. 651,161
In Great Britain January 30, 1932

3 Claims. (Cl. 18—15)

This invention relates to apparatus for the manufacture of films or foil, especially thin foil suitable for use as wrapping material, electrical insulation and other purposes. Such apparatus comprises means for depositing a layer of solution of material comprising the foil base in any suitable solvent on to a travelling support which carries the layer through a setting medium where the solvent is eliminated, and usually means for stripping the set foil from the support. The present invention is more particularly concerned with means for depositing the solution on to the support, and has for its object to enable the solution to be applied in an accurately controlled and even manner.

It will be understood that the properties of the foil, particularly strength and appearance, depend not only on the smoothness of the support on to which the solution is deposited, but also on the way in which it is deposited, and particularly on the maintenance of uniform thickness of the layer. Provided an even layer can be applied and prevented from running before a reasonable degree of setting has taken place, relatively little variation in thickness should be found in the finished foil. It has been found, however, that it is a matter of considerable difficulty to achieve such uniformity in practice, and most foils are found to vary in thickness to a greater or less extent. Such variation detracts from the utility of the foil in many ways. Thus the strength and resistance to moisture of the foil are reduced, while, of course, the weight of the foil, and consequently its cost, are higher than is necessary.

It has now been found, however, that if the foil forming solution is applied to the support by means of a resilient depositer roller carrying a layer of the solution, the even contact which can be maintained between the roller and the support over the whole width of the roller avoids to a large extent the chance of unevenness arising.

The resiliency of the depositing roller may be provided by the use of suitable resilient material as the surface of the roller, which material is free to give to any slight inaccuracies in the surface of the support, so that provided a substantially uniform layer of solution has been applied to the depositing roller, uniformity of transfer takes place between the roller and the support. The roller may, however, be resiliently mounted so as to yield as a whole and occupy a position in which true contact takes place over the whole length of the roller, thus avoiding any difficulty due to slight lack of parallelism between the support and the surface of the roller.

Again, for the same purpose, the surface of the roller may be of rigid material resiliently mounted on the axle or core of the roller so as to be free to give. If desired such resilient mounting of the roller surface may be employed where the surface itself is of a resilient character.

The surface of the roller should, of course, not be susceptible to attack by the solution to be applied. Thus, in the application of solutions of cellulose acetate in acetone, acetone-resistant rubber may be employed for the surface of the roller. Where, however, the resilient roller has a rigid surface, metals, e. g. stainless steel, nickel, or chromium, or materials such as synthetic resins, may be employed as the depositing surface.

Whatever the form of resilient roller it is desirable to employ means for controlling the degree of pressure between the roller and the support. Thus, a screw adjustment may be provided, preferably independently at each end of the roller axle.

The depositing roller according to the invention is capable of application to many different types of foil-making apparatus. For example, it may be used as a feeding device in the drum type of machine in which the foil is formed on the surface of a drum coated with gelatin, metal plated, or otherwise given a smooth finish, and carried thereby through a setting bath or atmosphere. Similarly it may be used where the foil-forming surface consists of an endless band. Thus, the band may be made of metal suitably supported to provide a run through a setting medium, and having a depositing surface formed of gelatin or the like, metal plating, or polished metal such as stainless steel or cold-worked nickel. Again, the roller may be used where the depositing surface consists of a suitably surfaced paper or the like band, such arrangement being especially useful for the production of foil by the dry method, the band being given a run of suitable length through a drying chamber.

Whatever the form of depositing surface, the nature of the surface and that of the depositing roller should be such as to ensure as even a contact as possible over the whole width of the roller so as to obtain an even transfer of solution from the roller to the surface. Then, aided by the resilient mounting or nature of the roller a very even foil results from the operation of the apparatus.

If required, two or more depositing devices may be used in sequence. For example one device may be employed to apply a wax or other non-permanent coating prior to deposit of the solution in the manner described in U. S. application S. No. 651,234 filed January 11, 1933. Similarly, a further depositing device may be used to apply a coating to the foil produced by one depositing device so as to produce a duplex foil, e. g. a coating of cellulose nitrate may be applied to cellulose acetate foil.

Where extreme accuracy is required in depositing materials other than that forming the basic foil, the further depositing device or devices used for this purpose is or are preferably of the resilient roller type used for the primary foil. If, however, such extreme accuracy is not required, other forms of depositing device, e. g. a hopper, may be employed.

By way of illustration, various forms of apparatus according to the invention are shown diagrammatically in the accompanying drawing, in which Fig. 1 is a part sectional view of the depositing and stretching end of a foil-forming machine showing one form of adjustment of the depositing roller;

Fig. 2 shows a machine employing two depositing devices;

Fig. 3 is a detail of a modified form of depositing device; and

Fig. 4 shows an alternative form of adjustment for the depositing roller.

Referring to Fig. 1, an endless band 5 of glazed paper or other material is guided by a roll 6 to a supporting roll 7 against which is pressed a depositing roll 8 consisting of a rubber covering 9 mounted on a core 10. A furnisher roll 11 is mounted in contact with the roll 8, the two rolls being carried above a trough 12 into which the furnisher roll dips. The two rolls are rotated in a clockwise direction by suitable gears (not shown) so that the roll 11 picks up solution, e. g. of cellulose acetate in acetone, from the trough 12 and applies a layer, controlled in quantity by the doctor blade 13, to the roll 8, which in turn transfers the layer to the band 5 passing over the supporting roll 7. The roll 8 preferably rotates at a greater peripheral speed than the linear speed of the band, and the roll 11 in turn at a greater peripheral speed than that of the roll 8 so as to ensure uniformity in the thickness of the layer of solution applied to the band 5.

A micrometer device 14 is provided to adjust the depositing device relatively to the roll 7 to assist in controlling the thickness of the layer.

As will be seen from the figure, the rubber covering 9 is of considerable thickness, so that its flexibility enables it to press firmly and evenly against the band on the roll 7 and avoid variation in the thickness of the layer due to any irregularities in the supporting band.

The solution is applied to the trough 12 from a container 15 under the control of a cock 16 so that a continuous supply of solution can be maintained. The rubber used for the covering 9 should, of course, be acetone-resistant. Similar rubber can be used for the doctor blade 13. After receiving the layer of solution, the band 5 proceeds through a drying casing 17 where solvent is eliminated, and finally passes over a stripping roll 18, the foil 19 produced by setting of the solution then being wound on the roll 20.

In Fig. 2 the band 5 carrying the deposited layer is shown passing over a number of rolls 21 in the casing 17 for the drying of the layer. The band is then directed by a roll 22 to a second supporting roll 23 where a further layer of material is applied by means of a resilient depositing roll 24. This layer may be, for example, a nitrocellulose solution for the purpose of decreasing the permeability of the foil to moisture, and/or may be coloured or pigmented to modify the appearance of the foil. The band is then directed by rolls 25 through a further drying run, and finally returns to the stripping roll 18.

Fig. 3 shows a depositing roll 26 comprising a smooth metal cover 27 of non-corroding material such as, for example, stainless steel, mounted on a rubber core 28 secured to a sleeve 29 carried by a shaft 30. Notwithstanding the rigidity of the metal cover 27 the rubber core 28 provides resilience to the depositing roll to enable it to bed firmly against the band 5 passing over the supporting roll 7.

In Fig. 4 depositing is effected by means of a rigid roll 31 carried in bearing blocks 32 slidable in a supporting frame 33. An adjusting screw 34 is arranged to press upon a rubber block 35 bearing against the bearing block 32, so that the roll 31 can be pressed to an adjustable degree against the band 5 passing over the roll 7. The rubber block 35 provides a certain amount of resiliency in the roller mounting to enable depositing of the solution to be effected uniformly. If desired, a further rubber block 36 may be placed at the rear of the bearing block 32 so that the bearing is sandwiched between the two rubber blocks to provide a better control over the resiliency of the roll 31. Moreover, the roll 31 may be of a resilient character as, for example, in the rolls 8, 26 shown in Figs. 1 and 3.

What I claim and desire to secure by Letters Patent is:—

1. In apparatus for the manufacture of films and foils, a movable support, means for supplying film- or foil-forming solution to said movable support, said means comprising a plurality of rollers in fixed relation to each other, and means for simultaneously adjusting said rollers with respect to said movable support.

2. In apparatus for the manufacture of films and foils, a movable support, means for supplying film- or foil-forming solution to said movable support, said means comprising a furnishing roller and a depositing roller in fixed relation to each other, and means for simultaneously adjusting said rollers with respect to said movable support.

3. In apparatus for the manufacture of films and foils, a movable support, means for supplying film- or foil-forming solution to said movable support, said means comprising a furnishing roller and a depositing roller in fixed relation to each other, a trough for supplying the solution to said furnishing roller and a doctor blade adapted to control the quantity of solution transferred to said depositing roller, and means for simultaneously adjusting said rollers with respect to said movable support.

EDWARD KINSELLA.